US008621510B1

United States Patent
Ho et al.

(10) Patent No.: US 8,621,510 B1
(45) Date of Patent: *Dec. 31, 2013

(54) TELEVISION SCRIPTING LANGUAGE

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,540

(22) Filed: Mar. 24, 2013

Related U.S. Application Data

(63) Continuation of application No. 11/983,896, filed on Nov. 13, 2007, now Pat. No. 8,434,105.

(51) Int. Cl.
*G06F 3/00* (2006.01)
*G06F 13/00* (2006.01)
*H04N 5/445* (2011.01)

(52) U.S. Cl.
USPC ............................................. 725/38; 725/46

(58) Field of Classification Search
USPC ....................................................... 725/38, 46
See application file for complete search history.

(56) References Cited

U.S. PATENT DOCUMENTS

| | | | |
|---|---|---|---|
| 2002/0042912 A1* | 4/2002 | Iijima et al. | 725/14 |
| 2002/0056095 A1* | 5/2002 | Uehara et al. | 725/38 |
| 2002/0073421 A1* | 6/2002 | Levitan et al. | 725/28 |
| 2003/0121057 A1* | 6/2003 | Singh | 725/132 |
| 2004/0098743 A1* | 5/2004 | Gutta et al. | 725/46 |
| 2007/0055994 A1* | 3/2007 | Orihara | 725/46 |
| 2008/0046919 A1* | 2/2008 | Carmi et al. | 725/32 |

* cited by examiner

*Primary Examiner* — Robert Hance
(74) *Attorney, Agent, or Firm* — North Shore Patents, P.C.; Michele Liu Baillie

(57) ABSTRACT

Provided is a method and system for television channel selection, including a television controller operatively connected to an electronic memory and configured to process a video selection script. The television controller is also operatively connected to the television and to a television network comprising a plurality of channels. Also provided is a script authoring tool for authoring a video selection script in a Web-based scripting language by a viewer. The television controller is further configured to select a channel to display on the television based on the video selection script and to dynamically update the video selection script based on the occurrence of an event.

27 Claims, 5 Drawing Sheets

TELEVISION SCRIPTING LANGUAGE

CROSS-REFERENCE TO RELATED APPLICATIONS

The present application is a continuation of co-pending U.S. patent application Ser. No. 11/983,896, filed on Nov. 13, 2007.

BACKGROUND OF THE INVENTION

1. Field of the Invention

This invention generally relates to media, and more particularly, to a method and system to tailor displaying on a television set based on a video selection script.

2. Background of the Invention

Prior to the advent of cable and satellite television, it was common for broadcast television to carry only a handful of analog television channels. With the wide deployment of cable and satellite television, it is now commonplace for a subscriber to have access to dozens of channels, even with only a basic service package. The present transition to digital television broadcast brings about additional excitement to consumers as hundreds of additional digital television channels become available. Some countries, such as Luxembourg and the Netherlands, have already completed their transition to digital broadcast television. Others are either in progress or are committed to the transition, including Brazil, China, Canada, Japan and the United States.

These available channels, when taken together with the hundreds or even thousands of additional television channels available via the Internet, provides the television consumer with a daunting task when trying to select a television channel for enjoyment. For example, it will take a consumer approximately 25 minutes to flip through 500 television channels even if each channel stays on for a mere 3 seconds. Even with the help of a program guide, or an electronic program guide ("EPG"), a consumer simply cannot easily keep track of what is on each of the numerous television channels, particularly when programming changes, overruns, delays or cancellations are involved.

This problem is even more profound for unscheduled television videos, such as are often made available dynamically via the Internet. In one example, an independent film maker releases a new movie about rising tennis star Ana Ivanovic. In another example, while vacationing in Japan, a tourist uploads a video clip of a magnitude 7.2 earthquake when it is happening. In yet another example, a freelance paparazzo reports breaking news with footage of celebrity Paris Hilton being stopped for a traffic violation. In another example, a high school orchestra director is offering the annual spring concert live online. In one more example, a proud parent just submits a funny video of her 2 year old child to an online competition.

In order to provide a personal viewing experience tailored to a consumer's interest, it is desirable to make sophisticated computing and dynamic decision making available on the consumer's side, namely at the television set. Furthermore, with the ever changing availability of numerous television videos, a computer scripting language that embodies the data and computing logic for selecting a television video is desirable in order to provide such a solution.

SUMMARY OF THE INVENTION

An aspect of the present invention provides a system and method for selecting a television channel for display on a television. The system and method includes authoring a video selection script in a scripting language, processing the video selection script by a television controller operatively connected to the television and also to a television network comprising a plurality of channels, selecting a channel to display on the television by the television controller based on the video selection script, and displaying the selected channel on the television.

In one aspect of the invention, the video selection script is based on a Web scripting language. For example, in an aspect of the invention, the Web scripting language is XML.

In another aspect of the invention, the method according to claim 1, wherein the video selection script scripting language is based on any one of: Hypertext Markup Language ("HTML"), JavaScript, Java, and Visual Basic Scripting Edition.

In an aspect of the invention, the video selection script includes a viewer interest, which may optionally be selected by the viewer. In an aspect, the selection of the viewer interest by the viewer is by use of a television remote.

In various aspects of the invention the video selection script includes data or computing logic, or both, and may be dynamically updated. in an aspect of the invention, dynamic updating is caused by an event.

Another aspect of the invention provides a television channel selection system that includes a television controller operatively connected to an electronic memory. The controller is configured to process the video selection script, and is operatively connected to the television and also to a television network which includes a plurality of channels. The controller is also connected to a script authoring tool for authoring a video selection script in a Web-based scripting language by a viewer, the video selection script including both data and computer logic. The television controller is further configured to select a channel to display on the television based on the video selection script, to display the selected channel on the television, and to dynamically update the video selection script based on the occurrence of an event.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Figure 1:
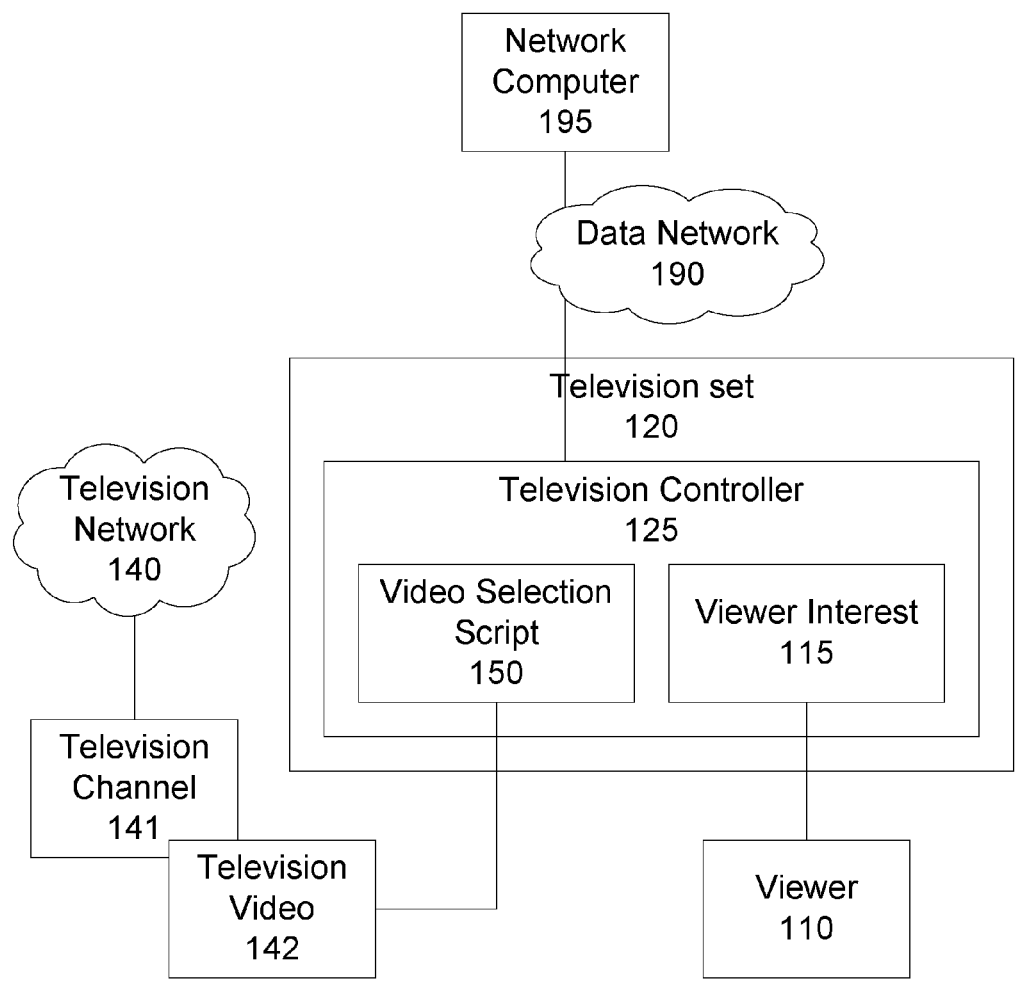
FIG. 1 is a schematic diagram illustrating a television set in accordance with an embodiment of the invention.

FIG. 1 illustrates an exemplary television set 120 displaying television video to enhance television viewing experience for a viewer. In an embodiment of the invention, television set 120 includes a television controller 125, which displays television video 142 on television set 120 based on a video selection script 150, thereby providing an enhanced television viewing experience for viewer 110.

In an embodiment, television controller 125 includes a computer processor operatively connected to a computer memory, one or more input devices, a television set 120, and to a network including a plurality of television videos. in operation, the video selection script 150 is loaded into the computer memory, and the computer processor is configured to read the video selection script 150, selecting one of the television videos to display on the television set 120 based on the video selection script 150.

Also in an embodiment, television controller 125 connects to a television network 140. In one embodiment, the television network 140 is a broadcast television network, such as a cable television network, a satellite television network, or terrestrial television network, also known as an over-the-air (hereinafter, "OTA") television network. In another embodiment, television network 140 is a broadband television network, such as one based on Internet Protocol ("IP") television technologies. In another embodiment, television video 142 represents a segment of programming of a television channel 141 from television network 140.

In various examples, television video 142 may be an episode of "CSI: Miami" shown on channel 54 (A&E) on Jul. 23, 2007 from 1:00 pm to 2:00 pm wherein television network 140 is Comcast cable network serving Palo Alto, Calif.; or a televised sports event "Bank of the West Tennis Classic at Stanford: Final" shown on channel 39 (ESPN2) on Jul. 29, 2007 from 2:00 pm to 5:00 pm; or a weekly episode of "Desperate Housewives" shown on channel 7 (ABC) every Sunday from 9:00 pm to 10:00 pm between Aug. 5, 2007 and Oct. 7, 2007; or "New Shanghai Bund Episode 23" shown on channel 26 (KTSF) on Jul. 25, 2007 from 8:00 pm to 9:00 pm wherein television network 140 is over-the-air (OTA) broadcast network serving the San Francisco Bay Area; or "Star Wars: The Phantom Menace" shown on channel 501 (HBO-Family) on Dec. 19, 2007 from 4:10 pm to 7:30 pm Pacific Standard Time (PST), wherein television network 140 is the DirectTV satellite television network; or any other television video content, without exception.

In an embodiment of the invention, television controller 125 processes video selection script 150. Video selection script 150 includes data and computing logic for automatically selecting television video 142 and for displaying television video 142 on television set 120.

In one embodiment of the invention, video selection script 150 is based on Web scripting language technologies, such that the video selection script 150 is encoded in a format similar to an Extensible Markup Language ("XML"). In another embodiment, video selection script 150 is encoded in another markup language, such as Hypertext Markup Language ("HTML"). Alternatively, the video selection script 150 may be encoded in JavaScript, Java, or Visual Basic Scripting Edition ("VBScript"), or hybrids thereof.

Figure 2:
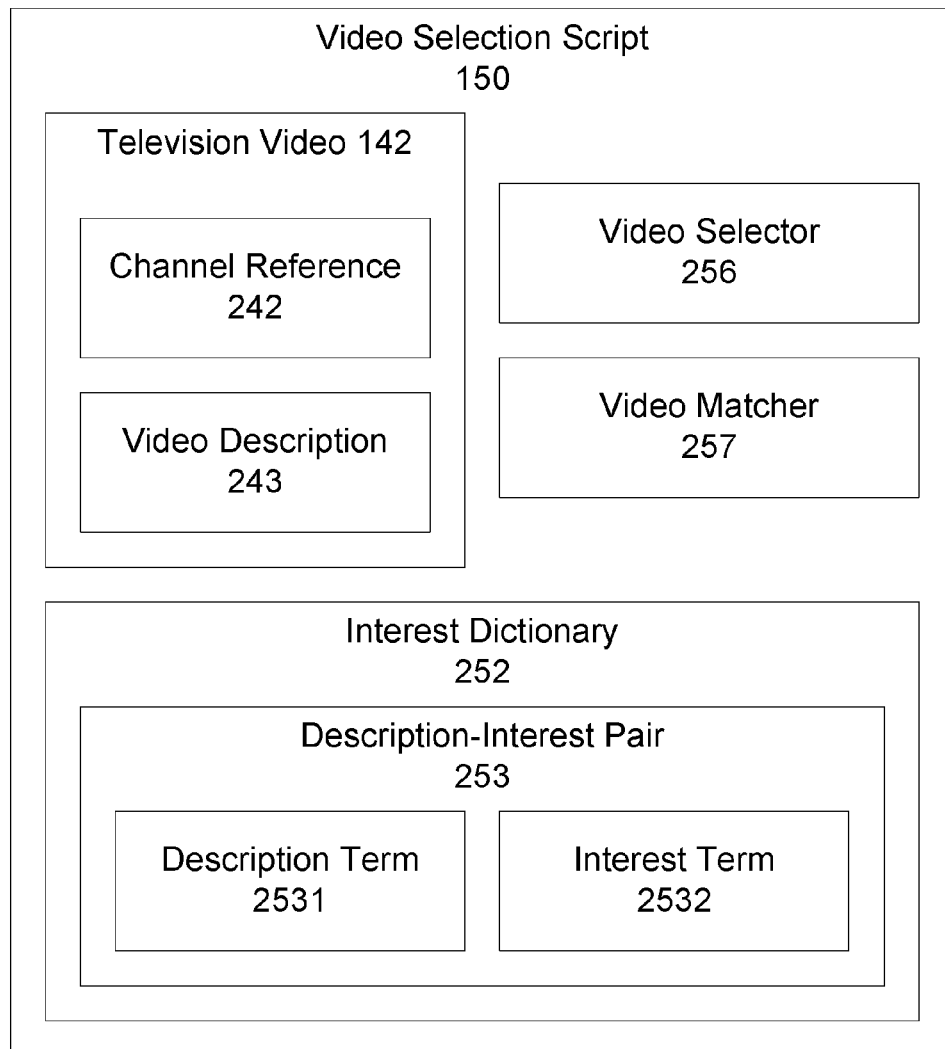
FIG. 2 is a schematic diagram illustrating a video selection script in accordance with an embodiment of the invention.

FIG. 2 illustrates an exemplary schematic layout for a video selection script 150. The video selection script 150 selects television video 142 that matches the viewer interest 115, based on the data and computing logic in the video selection script 150, which then displays television video 142 on the television set 120.

In an embodiment of the invention, the viewer 110 expresses viewer interest 115. In a further embodiment, the viewer 110 expresses viewer interest 115 to the television controller 125, for example, by using a remote control (not depicted). In one embodiment, the viewer 110 expresses viewer interest 115 during a user setup procedure for the television set 120. Examples of viewer interest 115 may include but are not limited to "sports", "travel", "movie", "music", "history", "science", "lifestyle", "religion" or "politics". In one embodiment, the viewer interest 115 is a particular type of sports, such as "tennis", "football", "soccer", "horse racing", "lacrosse" or "National Collegiate Athletic Association (NCAA) women's basketball". In another embodiment, the viewer interest 115 is a particular type of movie, such as "drama", "comedy", "crime" or "horror" movies. In another, the viewer interest 115 is the name of a television series, such as "Law and Order", "Medium", "Saturday Night Live", "The Oprah Winfrey Show", or "The David Letterman Show". In another embodiment, the viewer interest 115 is the name of an actress, such as "Jessica Alba" or "Angelina Jolie". In various embodiments, the viewer interest 115 is the name of an actor or a director, or the name of an athlete, a model, a celebrity, or a sports commentator. In another embodiment, the viewer interest 115 is a language, ethnicity or culture, such as "Chinese", "Spanish" or "Vietnamese".

An example of a television video 142 related to a viewer interest 115 is the movie entitled "Star Wars: The Phantom Menace" with viewer interest 115 "movie". In an embodiment of the invention, the video selection script 150 selects television video 142 since the television video 142 matches the viewer interest 115. Other examples of television video 142 related to viewer interest 115 include: a tennis live event "Breakfast at Wimbledon" related to "tennis" as viewer interest 115, an episode of television series "Survivor" and related to viewer interest 115 of "reality show", the talk show "News Hour with Jim Lehrer" and viewer interest 115 of "politics", the movie "Fantastic Four" starring actress Jessica Alba and viewer interest 115 of "Jessica Alba", the movie "Days of Thunder" that includes car racing scenes and viewer interest 115 of "car racing", and the movie "Rush Hour" with Spanish subtitles and viewer interest 115 of "Spanish".

Figure 3:
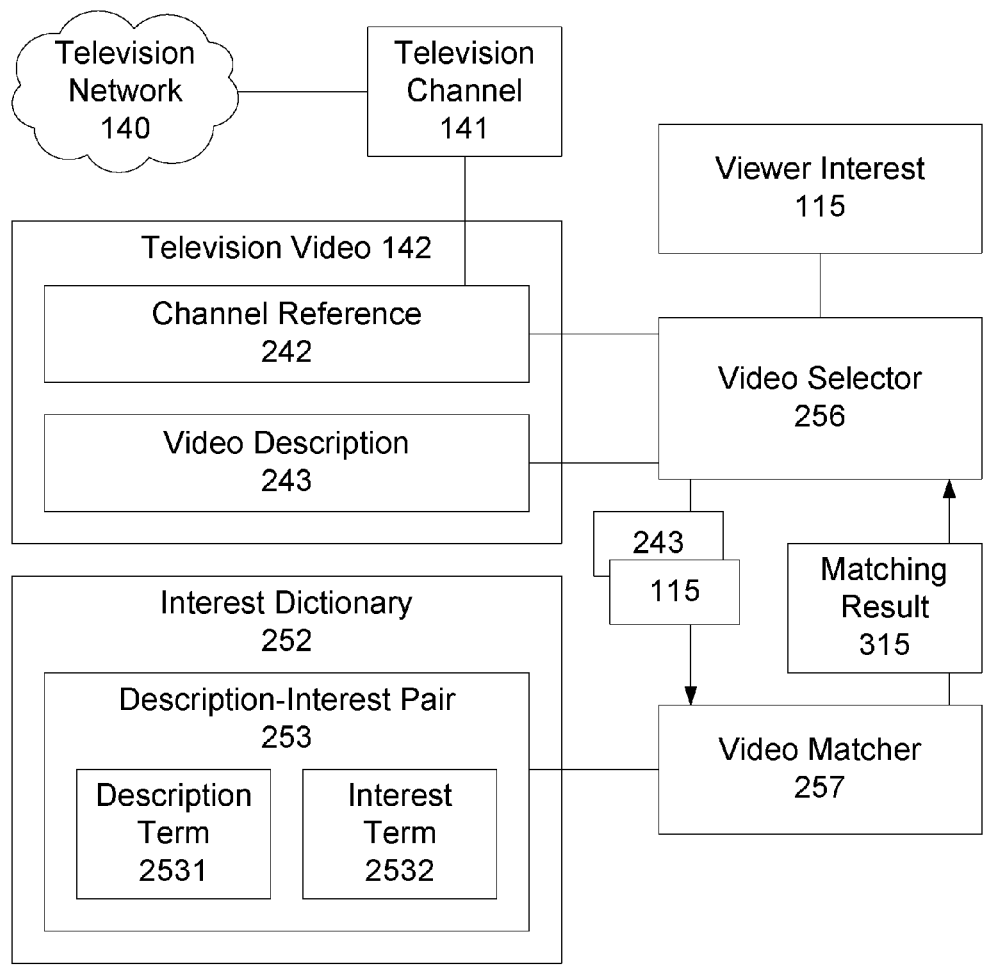
FIG. 3 is a schematic diagram illustrating a process for selecting and displaying television video in accordance with an embodiment of the invention.
Figure 4:
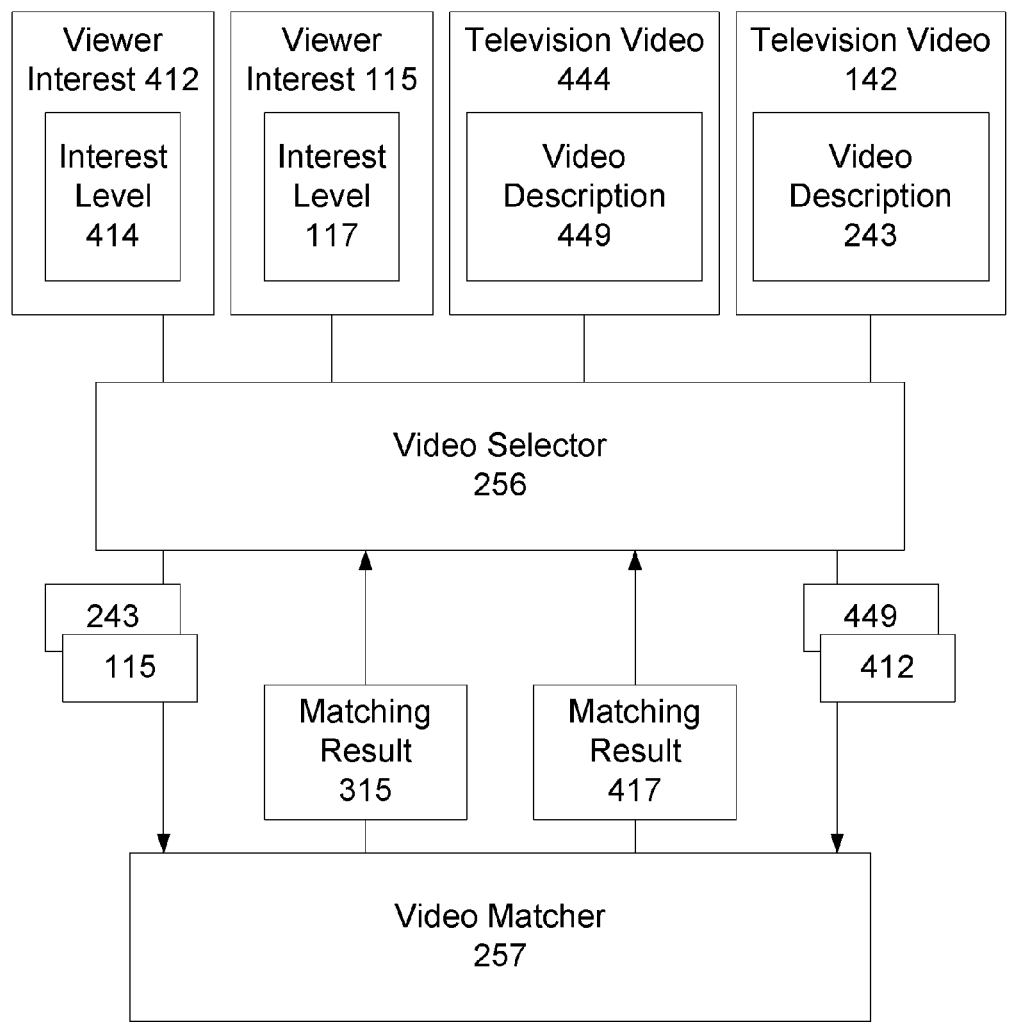
FIG. 4 is a schematic diagram illustrating a process for selecting television video based on viewer interest level in accordance with an embodiment of the invention.

Exemplary processes for selecting and displaying television video 142 based on the viewer interest 115 are illustrated in FIGS. 3 and 4.

In one embodiment, video selection script 150 includes language selecting television video 142 when viewer 110 first turns on television set 120. In another embodiment, video selection script 150 includes language selecting television video 142 while viewer 110 is watching another television video. Video selection script 150 may also or alternatively include language selecting television video 142 when the other television video ends. In another embodiment, video selection script 150 includes language selecting television video 142 when viewer 110 presses a "my favorite television video" button on a remote control in one embodiment, video selection script 150 includes language selecting television video 142 when viewer 110 changes from a television channel viewer 110 is watching.

In an embodiment of the invention, the viewer 110 can update the viewer interest 115. In an embodiment a remote control may be used by the viewer 110 to update the viewer interest 115 to the television controller 125. For example, the viewer 110 may change the viewer interest 115 from actor "Tom Cruise" to actor "Johnny Depp". The video selection script 150 would then include language selecting television video 142 after the viewer 110 updates the viewer interest 115.

Likewise, the viewer 110 can express an additional viewer interest 115. In one embodiment, viewer 110 expresses additional viewer interest 115 to television controller 125 using a remote control. In similar fashion, the video selection script 150 would then include language selecting television video 142 after viewer 110 updates the viewer interest 115.

In an embodiment of the invention, a television controller 125 obtains the video selection script 150 from a network computer 195 over a data network 190. The data network 190 may include the Internet, and, optionally, an Internet Service Provider (ISP) network. In another embodiment, the data network 190 includes a private network operated by or for a business, such as a hotel, a multi-tenant complex, a gym, or a rehabilitation center. The data network 190 may include a home network. In an embodiment, the network computer 195 includes a data server such as a web server. In one embodiment, network computer 195 includes a video server. In one embodiment, network computer 195 includes an Internet portal. In one embodiment, network computer 195 includes a social networking website. In one embodiment, network computer 195 includes a home network storage.

In an embodiment of the invention, the data network 190 is included in a television network 140. In one embodiment, the video selection script 150 is included in another television video; television controller 125 obtains video selection script 150 from the other television video.

In various embodiments of the invention, the television controller 125 obtains the video selection script 150 using Hypertext Transfer Protocol (HTTP), or using other technologies such as Web Services, remote method invocation (RMI), or Really Simple Syndication (RSS) technology. In alternative embodiments, television controller 125 obtains the video selection script 150 from a file, a video streaming object, or a multimedia container, such as the QuickTime (.mov) file, MPEG-2 transport stream container, MP4 file, RealMedia, or Flash Video.

The data or computing logic for automatically selecting television video 142 is subject to frequent and dynamic change. In one embodiment, the television controller 125 obtains the video selection script 150 after the data or computing logic changes. In another embodiment, the television controller 125 obtains the new data of video selection script 150. In yet another, the television controller 125 obtains the new computing logic of the video selection script 150.

The data or computing logic change may be due to any of several reasons, without limitation, including television programming overrun, delay, cancellation, or rescheduling. For example, a televised football game between the New England Patriots and the San Diego Charges is extended to overtime, causing a programming overrun. In another example, a television episode of "Law and Order" is delayed to make room for breaking news of mountain lion sighting in a local neighborhood. In yet another example, a live broadcast of Indianapolis 500 qualifying time trial is cancelled due to heavy rain.

The data or computing logic may also change due to an unscheduled television video becoming available. For example, an unscheduled television video may become available regarding an unfolding natural disaster, such as an earthquake, a hurricane, a forest fire, or a tsunami, without limitation. In another example, the unscheduled television video may be about emerging news of a war, a congressional session, an election, or a traffic accident. In yet other examples, the unscheduled television video may a movie just released by an independent film maker, or an Internet video clip whose popularity has just risen to top ten standing. In another example, the unscheduled television video is an Internet video just uploaded by an Internet user, or a video just announced by a media syndicate.

Changing the selection criteria for selecting television video 142 may also cause a computing logic change. In an embodiment of the invention, the selection criteria are changed to include video image matching. In another embodiment, the selection criteria are modified to reference a different interest dictionary, synonyms dictionary or foreign language dictionary. In other embodiments, the selection criteria are changed to reflect the popularity of celebrities or due to upcoming special or seasonal events such as Summer Olympics, Super Bowl, or World Cup Soccer, or to accommodate advertisement sponsorship.

Figure 5:
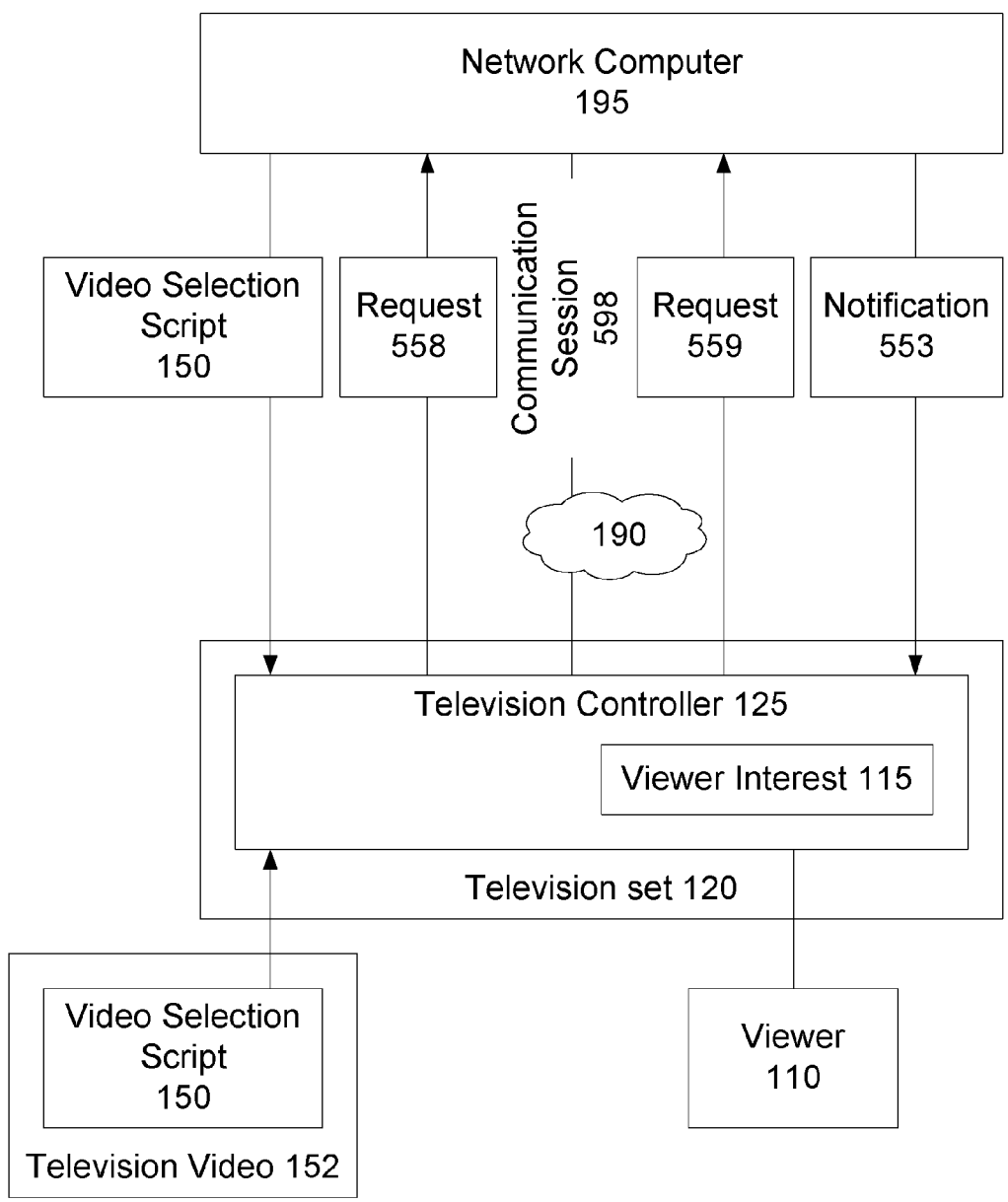
FIG. 5 is a schematic diagram illustrating a process for obtaining video selection script in accordance with an embodiment of the invention.

FIG. 5 illustrates an exemplary process for obtaining video selection script is illustrated in FIG. 5. In an embodiment, television controller 125 obtains video selection script 150 after viewer interest 115 is updated.

In one embodiment of the invention, the television set 120 connects to a television controller 125. Video selection script 150 includes language causing the television controller 125 to display television video 142 on television set 120 over the connection. In various embodiments, the connection includes a High Definition Multi-media Interface (HDMI), an S-Video interface, a composite interface, a component interface such as analog YPbPr or digital YCbCr interface, a radio frequency (RF) interface over a coaxial cable, a network such as an Ethernet, a Wireless Local Area Network (WLAN), a Worldwide Interoperability for Microware Access (WiMax) network, or an Ultra-Wideband (UWB) network, or combinations of these or others known in the art of television, without limitation.

FIG. 2 illustrates an exemplary video selection script 150. The video selection script 150 includes television video 142, video selector 256 and video matcher 257 information.

Video selection scripts 150 are created by any of several means. These include the use of one or more authoring tools, as well as computer software and hardware for automated video selection script generation. In an embodiment of the invention a viewer may create and save the video selection script using an authoring tool such as a document editing program, such as Microsoft Word®. In other embodiments, the video selection script 150 may be generated using computer software running on the television controller 125 or generated on the network computer or network computer server, without limitation. In one embodiment, the television controller is used to edit the video selection script 150 after it is created by an automated process.

Television video 142 includes a channel reference 242 and a video description 243. In one embodiment of the invention, channel reference 242 refers to television channel 141, wherein television video 142 represents a segment of programming of television channel 141. For example, channel reference 242 "tv://cable/channel/38" refers to television channel 141, wherein television channel 141 is cable television channel 38. In another example, channel reference 242 "tv://cable/channel/9.5" refers to cable television subchannel 9.5. In another example, channel reference 242 "tv://ATT-IPTV/channel/72" refers to ATT broadband television channel 72. In yet another example, channel reference 242 "tv://Verizon-tv/HBO-HD" refers to Verizon broadband television channel HBO-HD.

Video description 243 describes television video 142. In one embodiment, video description 243 includes a genre of television video 142, such as "movie", "sport", "situation comedy", "documentary", "news", "music", "science", "religion", or "lifestyle". In another embodiment, video description 243 includes "baseball", "basketball", "crime movie", "book review" or "reality shows". In other embodiments, video description 243 includes a title of television video 142, such as "The Oprah Winfrey Show", or "Breakfast at Wimbledon", or a name of an actress, an actor, a director, an anchor person, a professional athlete, a pastor, a host, or a celebrity, or language, ethnicity or culture affiliation, such as "Spanish", "Indian", or "Hong Kong". In another embodiment, video description 243 includes viewing options such as "close captioned", "Chinese subtitle", or "Vietnamese audio track" for television video 142. In another embodiment, video description 243 includes plot, summary, review, recommendation or critique of television video 142.

In an embodiment, the video selector 256 processes television video 142, and instructs the video matcher 257 to match the video description 243 against viewer interest 115, selecting television video 142 if the result from video matcher 257 is a match. After selecting television video 142, video selector 256 displays television video 142 based on channel reference 242. Details of the processing of video selector 256 are described in FIGS. 3 and 4.

Also in an embodiment, video matcher 257 matches video description 243 against viewer interest 115 and responds to video selector 256 with the matching result. Details of the processing of video matcher 257 are described in FIGS. 3 and 4.

In one embodiment, video selection script 150 includes an interest dictionary 252. Interest dictionary 252 includes at least one description-interest pair 253. Description-interest pair 253 typically includes a description term 2531 and an interest term 2532. In one example, description term 2531 is "baseball" and interest term 2532 is "sport". Other examples of description-interest pair 253 are description term 2531 "movie" and interest term 2532 "movie"; description term 2531 "crime movie" and interest term 2532 "movie"; description term 2531 "Breakfast at Wimbledon" and interest term 2532 "sport"; description term 2531 "Breakfast at Wimbledon" and interest term 2532 "tennis"; description term 2531 "Fantastic Four" and interest term 2532 "Jessica Alba"; description term 2531 "Jackie Chan" and interest term 2532 "Martial Art"; and description term 2531 "News Hour with Jim Lehrer" and interest term 2532 "politics".

The following is an example of part of video selection script 150 encoded in a format similar to XML wherein pseudo-code is used to describe the video selector and the video matcher:

```
<television-script>
<television-video >
  <channel-reference>tv://cable/channel/38</channel-reference>
  <video-description>
    <video-genre>sport</video-genre>
    <video-title>Breakfast at Wimbledon</video-title>
    <video-summary>
      World number 1 Roger Federer will battle Rafael
      Nadal of Spain for his quest to match Bjorn
      Borg's 5 consecutive Wimbledon men's signal
      title.
    </video-summary>
  </video-description>
</television-video>
<function>
  <function-name>videoSelector</function-name>
  <function-parameter></function-parameter>
  <function-body>
  {
    Set matching-result=videoMatcher(viewer interest, video-description)
    If (matching-result equal TRUE)
    {
      Obtain video signals from television channel
      referred to by channel-reference;
      Display video signals on television set;
    }
  }
  </function-body>
</function>
<function>
  <function-name>videoMatcher</function-name>
  <function-parameter>viewerInterest, videoDescription
  </function-parameters>
  <function-body>
  {
    Retrieve description-interest-pair from interest-dictionary;
    If  ((description-interest-pair.description-term)
         matches (videoDescription)
         and
         (description-interest-pair.interest-term) matches
         (viewerInterest)) then return TRUE;
  }
  </function-body>
</function>
<interest-dictionary>
  <description-interest-pair>
    <description-term>Breakfast at Wimbledon</description-term>
    <interest-term>tennis</interest-term>
  </description-interest-pair>
  <description-interest-pair>
    <description-term>crime movie</description-term>
    <interest-term>movie</interest-term>
  </description-interest-pair>
  <description-interest-pair>
    <description-term>Jackie Chan</description-term>
    <interest-term>Martial Art</interest-term>
  </description-interest-pair>
</interest-dictionary>
</television-script>
```

FIG. 3 illustrates a process for selecting and displaying television video based on viewer interest.

Video selection script 150 includes at least one television video 142. Video selector 256 retrieves television video 142 from video selection script 150. Video selector 256 instructs video matcher 257 to match video description 243 against viewer interest 115.

In one embodiment, video matcher 257 matches video description 243 against viewer interest 115 in conjunction with interest dictionary 252. Interest dictionary 252 includes description-interest pair 253. Description-interest pair 253 includes description term 2531 and interest term 2532.

Video matcher 257 matches description term 2531 against video description 243 and interest term 2532 against viewer interest 115. In one embodiment, the matching is based on key-word matching. In one embodiment, the matching is case sensitive. In one embodiment, the matching is based on exact word matching. In one embodiment, the matching is based on exact phrase matching. In one embodiment, the matching makes use of a synonyms dictionary. In one embodiment, interest dictionary 252 includes the synonyms dictionary. In one embodiment, video selection script 150 connects to the synonyms dictionary over a data network, such as data network 190. In one embodiment, the matching makes use of a foreign language dictionary. Matching algorithms are well known to those of skill in the art.

In one example, video description 243 includes "Breakfast at Wimbledon" and viewer interest 115 is "tennis". In one embodiment, description term 2531 is "Breakfast at Wimbledon" and interest term 2532 is "tennis". Video matcher 257 determines that video description 243 matches viewer interest 115 since description term 2531 "Breakfast at Wimbledon" matches video description 243 "Breakfast at Wimbledon" and interest term 2532 "tennis" matches viewer interest 115 "tennis". Video matcher 257 responds to video selector 256 with matching result 315 being positive.

In one example, video description 243 includes "Jackie Chan" and viewer interest 115 is "Kung Fu". In one embodiment, description term 2531 is "Jackie Chan" and interest term 2532 is "Martial Art". Video matcher 257 determines that video description 243 matches viewer interest 115 since description term 2531 "Jackie Chan" matches video description 243 "Jackie Chan" and interest term 2532 "Martial Art" is a synonym of viewer interest 115 "Kung Fu" according to the synonyms dictionary. Video matcher 257 responds to video selector 256 with matching result 315 being positive.

Based on positive matching result 315, video selector 256 selects television video 142. Video selector 256 obtains video signals from television channel 141 referred to by channel reference 242 and displays the video signals on television set 120. In one example, channel reference 242 is "tv://cable/channel/38"; video selector 256 obtains video signals from cable channel 38. In one example, channel reference 242 is "tv://cable/channel/9.5"; video selector 256 obtains video signals from cable subchannel 9.5. In one example, channel reference 242 is "tv://ATT-IPTV/channel/72"; video selector 256 obtains video signals from ATT-IPTV network channel 72. In one embodiment, television network 140 is a broadcast television network and television controller 125 connects to television network 140 via a broadcast television tuner, such as an analog channel tuner, a National Television System Committee (NTSC) tuner, an Advanced Television Systems Committee (ATSC) tuner, or a satellite television tuner. Video selector 256 obtains video signals by instructing the broadcast television tuner to select television channel 141 based on channel reference 242. In one embodiment, television network 140 is a broadband television network based on Internet Protocol technologies and television controller 125 connects to television network 140 via a broadband television tuner. Video selector 256 obtains television video 142 by instructing the broadband television tuner to select television channel 141 based on channel reference 242, wherein the broadband television tuner maps channel reference 242 to a Universal Resource Locator (URL) for obtaining video signals.

In one embodiment, video matcher 257 determines that video description 243 does not match viewer interest 115. Video matcher 257 responds to video selector 256 with matching result 315 being negative.

In one embodiment, video selection script 150 includes a second television video. Based on negative matching result 315, video selector 256 retrieves the second television video from video selection script 150. Video selector 256 instructs video matcher 257 to match video description of the second television video against viewer interest 115. In another embodiment, video selector 256 displays a message on television set 120 to inform viewer 110 that a television video that matches viewer interest 115 is unavailable.

FIG. 4 illustrates a process for selecting television video based on viewer interest level. Viewer interest 115 includes interest level 117. In one embodiment, viewer 110 expresses interest level 117. Interest level 117 represents a preference score viewer 110 has towards viewer interest 115. In one embodiment, interest level 117 is an integer value, wherein a higher value indicates a higher preference score. In one embodiment, a lower interest level 117 value indicates a lower preference score.

In one embodiment, viewer 110 expresses interest level 117 while expressing viewer interest 115 to television controller 125, for example, by using a remote control.

In one embodiment, viewer 110 expresses additional viewer interest 412, wherein viewer interest 412 includes interest level 414.

In this embodiment, video selection script 150 includes television video 142 and television video 444. Television video 142 includes video description 243. Television video 444 includes video description 449.

Video selector 256 instructs video matcher 257 to match video description 243 against viewer interest 115. Video matcher 257 responds to video selector 256 with a first matching result 315 being positive.

Video selector 256 instructs video matcher 257 to match video description 449 against viewer interest 412. Video matcher 257 responds to video selector 256 with a second matching result 417 being positive.

Video selector 256 compares interest level 117 of viewer interest 115 and interest level 414 of viewer interest 412. In one embodiment, interest level 117 is more preferable than interest level 414. Video selector 256 selects television video 142.

FIG. 5 illustrates a process for obtaining video selection script. Television controller 125 obtains video selection script 150 from network computer 195 over data network 190.

In one embodiment, television controller 125 obtains video selection script 150 after the data or computing logic for selecting television video 142 is changed. In one embodiment, video selection script 150 includes the changed data or computing logic.

In one embodiment, network computer 195 establishes a communication session 598 with television controller 125 over data network 190. Network computer 195 sends a notification 553 to television controller 125 over communication session 598, wherein notification 553 includes information for obtaining video selection script 150. In one embodiment, communication session 598 is based on Internet Protocol (IP). In one embodiment, communication session 598 is based on Web technologies. In one embodiment, communication session 598 is based on Remote Method Invocation (RMI), Really Simple Syndication (RSS) technology, or other proprietary technologies.

Television controller 125 receives notification 553. In one embodiment, notification 553 includes a URL such as an HTTP URL for obtaining video selection script 150.

Television controller 125 obtains video selection script 150 using the URL. In one embodiment, television controller 125 sends a request 559 over communication session 598 using the URL and receives video selection script 150 in a response for request 559. In one embodiment, the URL is an HTTP URL; television controller 125 sends an HTTP message using the HTTP URL and receives video selection script 150 in a response to the HTTP message.

In another embodiment, television controller 125 obtains video selection script 150 after viewer interest 115 is expressed or updated.

In one embodiment, television controller 125 sends a request 558 to network computer 195 and receives video selection script 150 in a response to request 558. In one embodiment, request 558 includes viewer interest 115. In one embodiment, television controller 125 sends request 558 over communication session 598. In one embodiment, television controller 125 sends request 558 over another communication session. In one embodiment, television controller 125 sends request 558 in a second HTTP message. Television controller 125 receives video selection script 150 in a response to the second HTTP message.

In a different embodiment, television controller 125 obtains video selection script 150 from network computer 195 periodically, such as every 10 minutes, every 30 minutes, every hour by the hour, or every 4 hours. In one embodiment, television controller 125 obtains video selection script 150 daily, or twice a day. In one embodiment, television controller 125 obtains video selection script 150 at random time.

In one embodiment, television set 120 displays a television video 152. Television video 152 includes television selection script 150. Television controller 125 obtains video selection script 150 from television video 152. Television selection script 150 displays television video 142, replacing the displayed television video 152. In one embodiment, television selection script 150 displays television video 142 simultaneously as television set 120 displays television video 152.

In one embodiment, video selection script 150 includes an interest level updater. Interest level updater updates interest level 117 after video selector 256 displays television video 142. In one embodiment, interest level updater updates interest level 117 after video selector 256 displays television video 142 for a period of time, such as 10 minutes, 20 minutes or 25 minutes. In one embodiment, interest level updater updates interest level 117 by increments interest level 117 by one. In one embodiment, interest level updater updates interest level 117 by adding the time duration of displaying television video 142.

In one embodiment, television video 142 includes a schedule. In one embodiment, the schedule includes a start time. In one embodiment, video selector 256 selects television video 142 since video description 243 matches viewer interest 115 and the schedule matches the current time. In one embodiment, the current time is after the start time. In one embodiment, the start time is within a short time period of the current time, such as 10 minutes, 3 minutes or 6 minutes. In one embodiment, the schedule includes an end time. In one embodiment, the schedule includes time duration.

In one embodiment, video selection script 150 obtains another television video for displaying on television set 120. In one embodiment, the other television video is related to television video 142. In one example, television video 142 is "Super Bowl XLII" and the other television video is related to pre-game interviews, team statistics, or highlights of Super Bowl XLII. In another example, television video 142 is the movie "Titanic" and the other television video is related to movie "Titanic", such as movie reviews, cast or director interviews, breaking news or gossip about leading stars Kate Winslet or Leonardo DiCaprio, movie trailers, history of Titanic, a book titled "Titanic", or a $50^{th}$ anniversary of Titanic.

In one embodiment, video selection script 150 obtains the other television video from a server over data network 190. In one embodiment, the other television video is from a network computer over data network 190. In one embodiment, the network computer is network computer 195. In one embodiment, the network computer includes a data server, web server, or a video server. In one embodiment, the network computer includes an Internet portal, a social networking site. In one embodiment, video selection script 150 obtains the other television video using Web technologies, such as Real-time Streaming Protocol (RTSP), Flash, Hypertext Transfer Protocol (HTTP), or QuickTime streaming technology. In one embodiment, the network computer includes a home network storage.

In one embodiment, video description 243 is video quality such as "high definition quality" or "standard definition quality" television video 142. In another embodiment, video description 243 is audio quality such as "DTS quality" or "Dolby Digital 5.1 quality" television video 142.

In one embodiment, video selector 256 prompts viewer 110 by displaying information about the selected television video 142. In one embodiment, the displayed information includes titles or images of television video 142. In one embodiment, viewer 110 confirms television video 142, for example, by using a remote control. Video selector 256 displays video signals from television channel 141.

In one embodiment, video selector 256 determines that there are more than one matching television videos. In one embodiment, video selector 256 displays information about the matching television videos on television set 120. In one embodiment, viewer 110 selects television video 142. Video selector 256 displays video signals from television channel 141.

In one embodiment, video selection script 150 selects television video 142 based on television video 152. In one embodiment, video selection script 150 selects based on a video image of television video 152. In one embodiment, video selection script 150 selects based on video description of television video 152. In one embodiment, television video 152 does not include video selection script 150.

In an embodiment of the invention, TPS list 180 comprises a plurality of programs TPS related to a common theme. For example, the theme may be related to an ethnic group, such as Japanese, French, or Spanish. In another example, the theme may be related to an age group, such as kids, teens, or adults. In another example, the theme may be related to a gender, like female or male. In another example, the theme may be related to an activity, such as cooking or home repair. In yet another example, the theme may be related to current events, such as the weather or news. In a last example, preview 216 of TPS 171 may include a summary of weather conditions, and broadcast channel 161 may be a weather channel.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for selecting a video channel, comprising:
   (a) comparing, by a television controller, a video description of the video channel against a viewer interest of a viewer using an interest dictionary, wherein the interest dictionary comprises a plurality of description-interest pairs, wherein each description-interest pair comprises a description term and an interest term, wherein the comparing (a) comprises:
      (a1) comparing the video description against the description term of a given description-interest pair in the interest dictionary; and
      (a2) comparing the viewer interest against the interest term of the given description-interest pair; and
   (b) determining whether to select the video channel based on the comparing (a).

2. The method of claim 1, wherein the determining (b) comprises:

(b1) in response to determining that the video description matches the description term of the given description-interest pair, and that the viewer interest matches the interest term of the given description-interest pair, selecting the video channel.

3. The method of claim 2, further comprising:
(c) sending the selected video channel to a television.

4. The method of claim 1, wherein the viewer interest comprises one or more of the following: sports; news; movies; travel; lifestyle; religion; politics; a name of a celebrity; a name of a language; or a culture.

5. The method of claim 1, further comprising:
receiving the interest dictionary over a data network.

6. The method of claim 1, wherein the video channel comprises one or more of the following: a broadcast television channel; or a video channel over Internet.

7. The method of claim 1, wherein the determining (b) comprises:
(b1) determining a second viewer interest of the viewer different from the viewer interest;
(b2) comparing a second video description of a second video channel against the second viewer interest of the viewer using the interest dictionary, wherein the comparing (b2) comprises:
(b2i) comparing the second video description against the description term of a second given description-interest pair in the interest dictionary; and
(b2ii) comparing the second viewer interest against the interest term of the second given description-interest pair; and
(b3) determining whether to select the first video channel or the second video channel based on the comparing (a) and the comparing (b2).

8. The method of claim 7, wherein the viewer interest comprises a first interest level and the second viewer interest comprises a second interest level, wherein the determining (b3) comprises:
(b3i) in response to determining that the video description matches the description term of the given description-interest pair, and that the viewer interest matches the interest term of the given description-interest pair, and
in response to determining that the second video description matches the description term of the second given description-interest pair, and that the second viewer interest matches the interest term of the second given description-interest pair,
selecting either the video channel or the second video channel based on the first interest level and the second interest level.

9. A non-transitory computer readable memory comprising computer readable program instructions for selecting a video channel, wherein the program instructions are configured to:
(a) compare a video description of the video channel against a viewer interest of a viewer using an interest dictionary, wherein the interest dictionary comprises a plurality of description-interest pairs, wherein each description-interest pair comprises a description term and an interest term, wherein the compare (a) comprises:
(a1) compare the video description against the description term of a given description-interest pair in the interest dictionary; and
(a2) compare the viewer interest against the interest term of the given description-interest pair; and
(b) determine whether to select the video channel based on the comparing (a).

10. The memory of claim 9, wherein the computer readable program code configured to determine (b) is further configured to:
(b1) in response to determining that the video description matches the description term of the given description-interest pair, and that the viewer interest matches the interest term of the given description-interest pair, select the video channel.

11. The memory of claim 10, wherein the computer readable program code is further configured to:
(c) send the selected video channel to a television.

12. The memory of claim 9, wherein the viewer interest comprises one or more of the following: sports; news; movies; travel; lifestyle; religion; politics; a name of a celebrity; a name of a language; or a culture.

13. The memory of claim 9, wherein the computer readable program code is further configured to:
receive the interest dictionary over a data network.

14. The memory of claim 9, wherein the video channel comprises one or more of the following: a broadcast television channel; or a video channel over the Internet.

15. The memory of claim 9, wherein the computer readable program code configured to determine (b) is further configured to:
(b1) determine a second viewer interest of the viewer different from the viewer interest;
(b2) compare a second video description of a second video channel against the second viewer interest of the viewer using the interest dictionary, wherein the compare (b2) comprises:
(b2i) compare the second video description against the description term of a second given description-interest pair in the interest dictionary; and
(b2ii) compare the second viewer interest against the interest term of the second given description-interest pair; and
(b3) determine whether to select the first video channel or the second video channel based on the compare (a) and the compare (b2).

16. The memory of claim 15, wherein the viewer interest comprises a first interest level and the second viewer interest comprises a second interest level, wherein the computer readable program code configured to determine (b3) is further configured to:
(b3i) in response to determining that the video description matches the description term of the given description-interest pair, and that the viewer interest matches the interest term of the given description-interest pair, and
in response to determining that the second video description matches the description term of the second given description-interest pair, and that the second viewer interest matches the interest term of the second given description-interest pair,
select either the video channel or the second video channel based on the first interest level and the second interest level.

17. The memory of claim 9, wherein the computer readable program code comprises a scripting language.

18. A system for selecting a video channel, comprising:
a television controller operatively coupled to a computer readable memory comprising program instructions, wherein when executed by the television controller causes the television controller to:
(a) compare a video description of the video channel against a viewer interest of a viewer using an interest dictionary, wherein the interest dictionary comprises a plurality of description-interest pairs, wherein each description-interest pair comprises a description term and an interest term, wherein the compare (a) comprises:
- (a1) compare the video description against the description term of a given description-interest pair in the interest dictionary; and
- (a2) compare the viewer interest against the interest term of the given description-interest pair; and (b) determine whether to select the video channel based on the comparing (a).

19. The system of claim 18, wherein in the determine (b), the television controller:
- (b1) in response to determining that the video description matches the description term of the given description-interest pair, and that the viewer interest matches the interest term of the given description-interest pair, selects the video channel.

20. The system of claim 19, wherein the television controller further:
- (c) sends the selected video channel to a television.

21. The system of claim 18, wherein the viewer interest comprises one or more of the following: sports; news; movies; travel; lifestyle; religion; politics; a name of a celebrity; a name of a language; or a culture.

22. The system of claim 18, wherein the television controller further:
receives the interest dictionary over a data network.

23. The system of claim 18, wherein the video channel comprises one or more of the following: a broadcast television channel; or a video channel over Internet.

24. The system of claim 18, wherein in the determines (b), the television controller further:
- (b1) determines a second viewer interest of the viewer different from the viewer interest;
- (b2) compares a second video description of a second video channel against the second viewer interest of the viewer using the interest dictionary, wherein the compare (b2) comprises:
  - (b2i) compares the second video description against the description term of a second given description-interest pair in the interest dictionary; and
  - (b2ii) compares the second viewer interest against the interest term of the second given description-interest pair; and
- (b3) determines whether to select the first video channel or the second video channel based on the compare (a) and the compare (b2).

25. The system of claim 24, wherein in the determines (b3), the television controller further:
- (b3i) in response to determining that the video description matches the description term of the given description-interest pair, and that the viewer interest matches the interest term of the given description-interest pair, and in response to determining that the second video description matches the description term of the second given description-interest pair, and that the second viewer interest matches the interest term of the second given description-interest pair,
selects either the video channel or the second video channel based on the first interest level and the second interest level.

26. The system of claim 18, wherein the television controller further:
receives the computer readable program instructions from a server over a data network.

27. A non-transitory computer readable memory comprising computer readable program instructions for selecting a television channel for display on a television, wherein the program instructions are configured to:
receive a viewer interest from a viewer of a plurality of channels;
receive a video selection script in a scripting language from a television network comprising the plurality of channels, the video selection script comprising an interest dictionary;
process the video selection script, comprising:
determine an interest level for each of the plurality of channels based on the video selection script by matching a video description of each of said plurality of channels against the viewer interest using an interest dictionary, wherein said interest dictionary includes a plurality of description-interest pairs comprising a description term and an interest term, wherein for each given channel of the plurality of channels, the determining of the interest level comprises:
compare the video description of the given channel against the description term of a given description-interest pair in the interest dictionary;
compare the viewer interest against the interest term of the given description-interest pair; and
in response to determining that the video description of the given channel matches the description term of the given description-interest pair and that the viewer interest matches the interest term of the given description-interest pair, determine that the interest level for the given channel matches the viewer interest; and
select a channel to display on the television by the television controller based on the determined interest level of the selected channel by comparing a determined interest level of each of said plurality of channels, wherein the selected channel is a channel with the highest interest level; and
display the selected channel on the television.

* * * * *